US010934661B2

(12) United States Patent
Bringewatt et al.

(10) Patent No.: US 10,934,661 B2
(45) Date of Patent: Mar. 2, 2021

(54) METHOD AND APPARATUS FOR LOADING A CLIP WITH AN ITEM OF LAUNDRY, IN PARTICULAR AN ITEM OF LAUNDRY TO BE SORTED

(71) Applicant: Herbert Kannegiesser GmbH, Vlotho (DE)

(72) Inventors: Wilhelm Bringewatt, Porta Westfalica (DE); Engelbert Heinz, Vlotho (DE); Jürgen Sielermann, Heubach (DE)

(73) Assignee: Herbert Kannegiesser GmbH, Vlotho (DE)

( * ) Notice: Subject to any disclaimer, the term of this patent is extended or adjusted under 35 U.S.C. 154(b) by 0 days.

(21) Appl. No.: 16/413,736

(22) Filed: May 16, 2019

(65) Prior Publication Data

US 2019/0368119 A1 Dec. 5, 2019

(30) Foreign Application Priority Data

May 29, 2018 (DE) ...................... 10 2018 004 271.6

(51) Int. Cl.
*D06F 93/00* (2006.01)
*B65G 47/90* (2006.01)
*D06F 95/00* (2006.01)

(52) U.S. Cl.
CPC ........... *D06F 93/00* (2013.01); *B65G 47/901* (2013.01); *D06F 95/00* (2013.01)

(58) Field of Classification Search
CPC .......... D06F 93/00; D06F 67/02; D06F 95/00; D06F 67/04; B65G 47/901

USPC ........................................... 414/13
See application file for complete search history.

(56) References Cited

U.S. PATENT DOCUMENTS

| | | | | | |
|---|---|---|---|---|---|
| 5,169,282 | A | * | 12/1992 | Ueda | D06F 67/04 38/7 |
| 6,477,797 | B1 | * | 11/2002 | Takahashi | D06F 67/04 38/143 |
| 2008/0092415 | A1 | * | 4/2008 | McCabe | D06F 67/04 38/143 |
| 2016/0145055 | A1 | * | 5/2016 | Sielermann | B65G 47/90 414/751.1 |

FOREIGN PATENT DOCUMENTS

| | | |
|---|---|---|
| DE | 3839045 A1 | 12/1989 |
| EP | 2336420 A2 | 6/2011 |
| JP | 6916063 B2 | 5/2016 |

OTHER PUBLICATIONS

European Patent Office, Europaischer Recherchenbericht (search in a related application), Jul. 16, 2019.

* cited by examiner

*Primary Examiner* — Lynn E Schwenning
(74) *Attorney, Agent, or Firm* — Laurence P. Colton; Smith Tempel Blaha LLC (57) ABSTRACT

A method and apparatus for transferring items of laundry after being separated first of all to a transfer device which then transfers the individual items of laundry to a loading device. The items of laundry are then hung individually by clips of the loading device into a clip which is in each case held ready and is to be loaded on the conveyor. Items of laundry can thereby be rapidly and reliably hung fully automatically into the clips to be loaded.

10 Claims, 9 Drawing Sheets

METHOD AND APPARATUS FOR LOADING A CLIP WITH AN ITEM OF LAUNDRY, IN PARTICULAR AN ITEM OF LAUNDRY TO BE SORTED

CROSS REFERENCE TO RELATED APPLICATIONS

This patent application claims priority on and the benefit of German Patent Application No. 10 2018 004 271.6 having a filing date of 29 May 2018.

BACKGROUND OF THE INVENTION

Technical Field

The invention relates to a method for loading a clip with an item of laundry, in particular an item of laundry to be sorted, the item of laundry being separated by a separating device and subsequently being transferred to the clip to be loaded, and to an apparatus for loading a clip with an item of laundry, with a transfer device preferably following a separating device and with a conveyor which preferably has a plurality of clips to be loaded.

Prior Art

Items of laundry hanging on clips are transported through a laundry for various purposes. Above all, individual items of laundry hanging on in each case one clip, in particular dirty items of laundry, are sorted in laundries.

After the sorting of the items of laundry, each individual item of laundry has to be loaded into a clip transportable along the conveying section. It has been attempted to automatize said loading. The known loading of the clips does not operate with sufficient reliability and/or it is too time-consuming.

BRIEF SUMMARY OF THE INVENTION

The invention is based on the object of providing a method and an apparatus for loading a clip with an item of laundry, in particular an item of laundry to be sorted, said method and apparatus operating reliably and being efficient.

A method for achieving this object is a method for loading a clip with an item of laundry, in particular with an item of laundry to be sorted, the item of laundry being separated by a separating device and subsequently being transferred to the clip to be loaded, wherein the item of laundry is grasped by a movable double clip of a transfer device downstream of the separating device, the item of laundry is taken over or transferred from the double clip by a loading device, and the item of laundry is fed by the loading device into a clip mouth of the clip to be loaded. This method makes provision for the separated item of laundry to be grasped from a movable double clip of a transfer device, for the item of laundry grasped from the double clip to be taken over or to be transferred by a loading device and for the item of laundry to be fed by the loading device into a clip mouth of the clip to be loaded. This sequence of a plurality of automatic work processes enables the individual steps for loading a clip to take place reliably and also more rapidly.

An advantageous possibility of refining the method makes provision for the item of laundry to be fed by two adjacent clips of the loading device into the clip to be loaded, by synchronous movement and moving of the adjacent clips past the clip to be loaded. As a result, a frictionless, virtually flying change of that region of the item of laundry which is held by the adjacent clips of the loading device to the clip to be loaded takes place.

In an advantageous manner, a peripheral strip or peripheral portion of the item of laundry located between the adjacent clips and/or the clips of the double clip is kept stretched by the double clip of the transfer device and/or adjacent clips of the loading device. As a result, a defined, virtually rectilinearly oriented edge, namely of the peripheral strip and/or of the peripheral portion, of the item of laundry is available for the transfer to the following clip of the loading device and/or clip to be loaded. This makes the transfer operation of the item of laundry from one clip to the other more reliable and ensures rapid and secure automatic grasping of the item of laundry by the next clip. The peripheral strip or peripheral portion is preferably located in a corner region of the item of laundry or starts from a covering thereof.

In an optionally developed method, the item of laundry with peripheral strip, peripheral portion and/or corner region kept stretched by the clips of the loading device is pushed into the clip to be loaded as the adjacent clips of the loading device move past the latter. This permits a rapid change of the defined, held peripheral strip or the like of the item of laundry from the respective clip to the other clip. This change can take place above all rapidly and reliably without any manual activity.

It can be provided that the peripheral strip, peripheral region and/or corner region of the item of laundry kept stretched by the spaced-apart parallel clips of the double clips can be reoriented or can be rotated and/or can be pivoted by said double clips. This makes it possible to bring the double clip into the optimum position firstly for taking over the item of laundry in the separating device and secondly for transferring the item of laundry to the loading device, wherein the reorientation capability of the double clip makes it possible for the taking over and passing on or transfer position of the item of laundry to differ from one another.

The method can be developed in a particularly advantageous manner if, for the taking over of an item of laundry from the two adjacent clips of the loading device, the clip to be loaded is briefly stopped in a lower deflecting region of a U-shaped portion of the conveying section of the conveyor thereof, wherein the loading of said clip can take place particularly reliably during the momentary halt.

A further preferred possibility of developing the invention makes provision for the clip to be loaded to be loaded with clip mouths oriented transversely with respect to the vertical plane in which the U-shaped portion of the conveying section, at which the loading of the clip to be loaded takes place, runs. With the clip mouth oriented in said plane, said clip which is held ready is then loaded with the item of laundry. As a result, the U-shaped portion of the conveying section serving for the loading of the clip runs in a plane transversely with respect to the path of movement of the two adjacent loading-device clips feeding the item of laundry into the clip to be loaded. After an item of laundry is transferred to a clip to be loaded, the loading device does not interfere with the continued movement of the loaded clips along the conveying section, in particular that region of the conveying section which runs in a U-shaped manner, at which the loading of the clip of the conveying section takes place. After its loading is completed, the loaded clip can immediately be moved further in order to rapidly move the taken-over item of laundry out of the region of the loading in order to make space for loading a next clip with a following item of laundry and to rapidly further move the final loaded clip, in particular along a conveying section for sorting items of laundry. The sorting efficiency can thereby be increased.

Another possibility of refining the method makes provision for the loading device to have at least one preferably tongue- or sword-like slider which pushes the respective item of laundry with the corner region or the like held by the double clip into the clip mouth of the clip to be loaded. In this possibility of refining the method, the loading device does not need to grasp the item of laundry for transferring same to the clip to be loaded.

An apparatus for achieving the object mentioned at the beginning is an apparatus for loading a clip with an item of laundry, with a transfer device preferably following a separating device and with a conveyor which preferably has a plurality of clips to be loaded, wherein the transfer device has at least one double clip, and a loading device is arranged downstream of the transfer device, by which loading device the item of laundry can be transferred into the respective clip to be loaded. Said apparatus is provided with a transfer device with at least one double clip, and a loading device arranged downstream of the transfer device, wherein the respective item of laundry can be transferred and/or can be inserted by the loading device into the clip to be loaded. By means of the provision of the transfer device and the loading device and the design of the transfer device of at least one double clip, the tasks are specifically divided up during the loading of the respective clip assigned to the following conveying section. The individual devices thereby have functions which are not highly complex. The devices can thereby be configured simply and formed compactly. Simple and precise movement sequences of the individual device for loading the respective clip of the conveying section are thus possible. The individual consecutive devices need in each case only to have short transport distances, which reduces the cycle time for loading the respective clip with a separated item of laundry.

An advantageous development of the apparatus makes provision for the double clip to be rotatable and, alternatively or additionally, to be pivotable. The double clip is rotatable preferably about an axis of rotation which perpendicularly intersects an imaginary connecting line between the two clips of the double clip. As a result, when the double clip is rotated, the two clips move around the axis of rotation in the manner of a propeller. The item of laundry held by the double clip can thereby be reoriented into an optimum position for transferring the item of laundry to the following loading device. Said rotation of the double clip can take place during the movement of same to the loading device, and therefore, by means of combined movements, only a short cycle time is required for transferring the respective separated item of laundry from the separating device to the loading device with simultaneous reorientation of the item of laundry. By means of pivoting of the double clip, the peripheral strip of the item of laundry that is kept taut by same can also or alternatively to the rotation be brought into the desired transfer position with the clips of the loading device.

According to an advantageous possibility of developing the apparatus, it is provided to design the double clip to keep a narrow peripheral strip and/or a narrow portion of a periphery of the item of laundry stretched. The peripheral strip or peripheral portion preferably starts from a corner, in particular any desired corner, of the item of laundry. The double clip then holds as it were a corner region of the item of laundry, with the narrow portion of the periphery of the item of laundry belonging to said corner region being held in a stretched and/or taut manner between two adjacent and spaced-apart clips of the double clip. This facilitates the transfer of the item of laundry to the following loading device.

In an advantageous refinement of the apparatus, it is provided that the loading device has two adjacent clips which are designed for taking over the item of laundry held by the clips of the double clip. In particular, the clips are designed in such a manner, and provided at such a distance, that they are designed for directly taking over, in particular gripping, the narrow peripheral strip or narrow portion of the periphery of the item of laundry kept stretched between the double clip of the transfer device.

It is particularly advantageous if the peripheral strip or narrow portion of the edge to be taken over by the two adjacent, spaced-apart clips of the loading device starts from preferably any desired corner of the item of laundry. The two adjacent clips of the loading device then grasp the stretched narrow peripheral portion or peripheral strip or corner region which starts from a corner of the item of laundry or can also be spaced apart from said corner. This makes it possible to feed the item of laundry by a corner region or a corner into the clip to be loaded and therefore to load the respective clip of the conveying section with one corner or a corner region, corner portion or the like of an item of laundry.

It is preferably provided that the tight distance between the adjacent clips of the double clip of the transfer device is greater than the outside distance of the adjacent clips of the loading device. As a result, in order to take over an item of laundry from the double clip, the adjacent clips of the loading device can move between the adjacent clips of said double clip and in a targeted manner can grasp the peripheral portion and/or corner region of the item of laundry held between said clips. This permits a reliable and nevertheless rapid taking over of the item of laundry by the loading device from the double clip of the transfer device.

Furthermore, it is preferably provided to select the clear inner distance between the adjacent clips of the loading device to be of such a size that said distance is greater than preferably the same width of all of the clips of the conveyor to be loaded. As a result, the peripheral portion and/or corner portion of the item of laundry kept stretched between the adjacent, spaced-apart clips of the loading device is pushed in a targeted manner into the clip mouth of the respective clip to be loaded as the adjacent clips of the loading device move past the latter. During this transfer, the respective clip to be loaded is preferably momentarily at a halt while the adjacent clips of the loading device move continuously past the clip. At the same time, the peripheral portion or corner region of the item of laundry is pushed into the clip mouth of the clip to be loaded and the peripheral portion and/or corner region of the item of laundry is pulled out of the adjacent clips of the loading device. Such a transfer operation takes place rapidly and reliably, virtually "in a flying manner".

According to an advantageous possibility of developing the apparatus, the adjacent clips of the loading device are movable to and fro along a rectilinear transfer path lying on the axis of rotation of the double clip during the transfer. The loading device thereby needs only to execute a simple linear movement in order to take over the item of laundry from the double clip of the transfer device and to push same into the clip mouth of the clip which is held ready and is to be loaded. Said two taking-over and transfer operations can be realized solely by movement of the two spaced-apart, adjacent clips of the loading device along their rectilinear transfer path.

The above-described method and the apparatus are particularly suitable for loading clips which are moved on a conveying section of a sorting device by a conveyor of a transport system. The described method and the apparatus is also particularly suitable for sorting items of laundry, in particular for sorting dirty laundry.

BRIEF DESCRIPTION OF THE DRAWINGS

A preferred exemplary embodiment of the invention will be explained in more detail below with reference to the drawings, in which.

DETAILED DESCRIPTION OF PREFERRED EMBODIMENTS

The apparatus is illustrated in the figures only with its functional parts, in particular functional parts serving for carrying out the method, but without the frame-like stand of said apparatus and the housing of same. The frame-like stand and the housing of the apparatus have been omitted for the purpose of better identifiability of the functional parts of the apparatus and therefore in the figures.

The apparatus serves to feed separated items of laundry 10 from a laundry heap into successive clips 11 to be loaded. The clips 11 hang on a conveyor 12 which is only partially illustrated in the figures and which further transports the individual items of laundry 10 along a corresponding conveying section in the laundry.

The conveyor 12 preferably serves to transport clips 11, which are each loaded with an item of laundry 10, along their conveying distance through a sorting station and, in the process, to sort the items of laundry 10 in accordance with predetermined sorting criteria. The apparatus has the task here of automatically loading the clips 11 hanging on the conveyor 12 with individual items of laundry 10.

The items of laundry can be flat laundry, such as, for example, tablecloths, bed covers or the like, or else shaped parts, for example, trousers, overalls, shirts or the like.

The apparatus preferably loads the clips 11 of the conveyor 12 with items of laundry 10 which are sorted and subsequently washed or cleaned in some other way. The apparatus is then arranged upstream of a dirty laundry sorting operation, in which the items of laundry 10 hanging on the clips 11 are transported by the conveyor 12 through the at least one sorting station and, in the process, are sorted in particular according to the washing criteria thereof, whereupon the items of laundry 10, in particular dirty items of laundry, are washed in a targeted manner or cleaned in some other way.

A horizontal or optionally also inclined batch feed conveyor, which is designed in the exemplary embodiment shown as a belt conveyor 13, is located in the starting region of the apparatus. A laundry heap or laundry batch, not shown in the figures, consisting of a multiplicity of preferably different items of laundry 10, in particular dirty items of laundry, can be transported by the belt conveyor 13 to a separating device 14 of the apparatus. The belt conveyor 13 can be driven in such a manner that an upper strand thereof supporting the laundry heap is moved to the separating device 14.

The separating device 14 shown here operates in two stages, namely with preliminary separation and with post-separation. However, the invention is not restricted thereto.

The separating device 14 has a gripper 15 taking on the preliminary separation. Ideally, the gripper 15 always grasps only one single item of laundry 10 from the laundry heap on the belt conveyor 13. However, it can also simultaneously pick out a plurality of items of laundry 10 from the laundry heap if—as in the exemplary embodiment shown—the apparatus permits post-separation.

At at least one suitable location, at least one imaging device is assigned to the laundry heap on the belt conveyor 13. This can involve a plurality of two-dimensional cameras arranged at different locations or else a single three-dimensional camera. The at least one imaging device, not shown in the figures, can identify the laundry heap on the belt conveyor 13 and can thus detect a favorable or most favorable point of the laundry heap for a gripper 15 of the separating device 14, at which point the gripper 15 can best grasp, if possible, a single item of laundry 10 and can pull same out of the laundry heap.

The or each item of laundry 10 grasped by the gripper 15 at the position determined by the imaging device is pulled upward out of the laundry heap by movement of the gripper 15 upwards by means of a shuttle cylinder 16 supporting the latter. The ideally single item of laundry 10 is grasped by the gripper 15 at any desired point and pulled out of the laundry heap. The item of laundry 10 grasped by the gripper 15 at any desired location or optionally also a plurality of items of laundry 10 grasped simultaneously by the gripper 15 at any desired, also different, points is or are subsequently transferred by the gripper 15 either directly to a post-separating device 17, which is preferably part of the separating device 14, or the gripper 15 transfers the or each held item of laundry 10 first of all to a clip which supplies the individual item of laundry 10 or a plurality of items of laundry 10 to the post-separating device 17.

If only an individual item of laundry 10 is located in the post-separating device 17, said item of laundry is transported through the post-separating device 17 in such a manner that a rear corner 18 of the item of laundry 10 is formed in the post-separating device 17. The item of laundry 10 here hangs at the corner 18 under the post-separating device 17, with the rear corner 18 of the item of laundry 10 being briefly retained and/or held back by the post-separating device 17. In the case of a plurality of items of laundry 10, in particular two items of laundry, entering the post-separating device 17 simultaneously, two successive rear corners 18 of the two items of laundry 10 are formed. As the two items of laundry 10 pass through the post-separating device 17, preferably after they pass through same, only the trailing, rear corner 18 of a single item of laundry 10 is retained by said post-separating device, and therefore the other item of laundry 10 is dropped by the post-separating device 17 after passing therethrough. Said item of laundry 10 can then be transported back by a return conveyor (not shown) to the laundry heap on the belt conveyor 13.

In a particular manner according to the invention, the apparatus is now formed downstream of the post-separating device 17. For this purpose, the apparatus has a transfer device 19 following the post-separating device 17, and a loading device 20 arranged downstream of said transfer device. The transfer device 19 takes over a separated item of laundry 10 at or in the vicinity of the rear corner 18 from the post-separating device 17 and transfers the item of laundry 10 with the point held by the transfer device 19 to the loading device 20. From the loading device 20, the same point, preferably the rear corner 18, of the item of laundry 10 is then pushed into a clip mouth 21 of the clip 11 to be loaded of the conveyor 12, specifically at a lower deflecting end of a U-shaped loading portion 22 of the conveyor 12.

The transfer device 19 has a linear drive which supports a double clip 23. The linear drive of the transfer device 19 can have a shuttle cylinder 24 which can be driven electronically by a cylinder actuated by a pressure medium, in particular a cylinder actuated by compressed air, or else a servomotor. The double clip 23 is movable by the shuttle cylinder 24 on a rectilinear path which, in the exemplary embodiment shown, runs horizontally, but can also have an upwardly or downwardly inclined profile.

The double clip 23 has two adjacent, identical clips 25 which are, however, arranged in a mirror-inverted manner from each other. The two clips 25 are connected to each other via a web of the double clip 23, and therefore they are integrally linked together. The two clips 25 run parallel to each other and are spaced apart from each other, as a result of which an intermediate space 26 is produced between the clips 25.

In the example shown, the double clip 23 is connected rotatably to a rotor of the shuttle cylinder 24, said rotor being movable on the rectilinear path. The double clip 23 can be movable or pivotable instead on a rectilinear path but also on a different path. The double clip 23 can be rotated by at least a certain angular range by means of a suitable drive. An axis of rotation 27 of the double clip 23 runs parallel to the clip centrally between the two spaced-apart clips 25 of the double clip 23. Similarly, the axis of rotation 27 extends centrally through the intermediate space 26 between the clips 25.

It is conceivable for the double clip 23 additionally to be pivotable about a pivot axis 28 perpendicularly intersecting the axis of rotation 26, specifically likewise by means of a suitable drive.

The drive for rotating the double clip 23 about the axis of rotation 27 and/or for pivoting the double clip 23 about the pivot axis 28 is preferably designed as what is referred to as a servodrive, with which rotations or pivotings of the double clip 23 about precisely predeterminable angular ranges are possible.

The loading device 20 which takes over the respective individual item of laundry 10 from the double clip 23 and pushes same into the clip mouth 21 of the clip 11 to be loaded has two preferably identical clips 29. Said two clips 29 of the loading device 20 are also spaced apart from each other in a manner running parallel to each other. The distance between said two clips 29 is smaller than the distance between the two clips 25 of the double clips 23, specifically in such a manner that the two parallel clips 29 of the loading device 20 can enter the intermediate space 26 between the two clips 25 of the double clips 23. Consequently, the width of the intermediate space 26 of the double clip 23 is greater than the distance of the outsides of the two adjacent clips 29 of the loading device 20. Each clip 29 of the loading device 20 is assigned a dedicated linear drive which, in the exemplary embodiment shown, is also designed as a shuttle cylinder 30 actuated by pressure medium. The shuttle cylinders 30 are designed in the same manner as the clips 29, but are arranged in a mirror-inverted manner with respect to one another. An intermediate space 31, which is narrower than the intermediate space 26, between the clips 29 and the shuttle cylinders 30 of the loading device 20 is dimensioned in such a manner that it is greater than the width of the identical clips 11 below the conveyor 12, preferably is twice to four times as large. As a result, the clips 29 assigned to the shuttle cylinders 30 can move on both sides past the respective clip 11 to be loaded. The arrangement and dimensioning of the loading device 20, in particular of each shuttle cylinder 30, and the clip 29 assigned to the latter is selected here such that the clip mouths 32 of the clips 29 as the latter move along on opposite sides of the respective clip 11 to be loaded are movable on a preferably rectilinear movement path, but optionally also on a curved movement path, laterally next to the clip 11. The clip mouths 32 of the clips 29 of the loading device 20 are directed in precisely the same manner as the clip mouth 21 of the clips 11 to be loaded and are also open toward the same side.

In the transfer position of the item of laundry 10, the double clip 23 of the transfer device 19 is pivoted about its pivot axis 28 with respect to the clips 29 of the loading device 20 or—if said double clip is not pivotable—is positioned in such a manner that clip mouths 33 are inclined obliquely downward toward the free end. In the exemplary embodiment shown, the clip mouths 33 of the double clips 23 run at an angle of 90° to the clip mouths 32 of the clips 29 of the loading device 20. The transfer then takes place with transversely directed clip mouths 32 and 33 offset by 90°. However, an alternatively exemplary embodiment of the apparatus is conceivable, in which the clip mouths 32 of the clips 29 of the loading device 20 and the clip mouths 33 of the clips 25 of the double clip 23 lie on the same axis. Said axis preferably involves parallel linear axes, on which the clips 29 of the loading device 20 are movable by the shuttle cylinders 30 assigned thereto from the transfer device 19 to the clip 11 to be loaded, and vice versa. The open sides or ends of the clip mouths 32 of the clips 29 of the loading device 20 and of the clip mouths 33 of the clips 25 of the double clip 23 then face one another. As a result, the peripheral portion 34 or peripheral strip 35 of the respective item of laundry 10 held by the double clip 23 can be pulled by the clips 29 of the loading device 20 rectilinearly out of the clips 25 of the double clips 23 of the transfer device 19.

The clip mouth 21 of the clip 11 to be loaded is also oriented in such a manner that it lies in a direction parallel to the likewise parallel, rectilinear and preferably obliquely rising linear axes of the shuttle cylinders 30. For this purpose, the clips 11 to be loaded are held ready by the conveyor 12 momentarily at a halt at the lowest point of the lower deflection of the U-shaped loading portion 22 of the conveyor 12 in such a manner that the clip 11 runs centrally in the same direction between the two parallel spaced-apart rectilinear linear axes of the shuttle cylinders 30 for the clips 29 of the loading device 20. The clip mouth 21 of the respective clip 11 to be loaded lies in the same direction here as the rectilinear and parallel movement paths of the clips 29 between the parallel linear axes of the two shuttle cylinders 30 such that not only do the linear axes run parallel to one another, but so too does the clip mouth 21 of the clip 11 to be loaded.

The method according to the invention will be explained below with reference to in particular the transfer device 19, the loading device 20 and the loading of a respective clip 11 held ready by the conveyor 12:

From the item of laundry 10 which has passed through the post-separating device 17 and is still held with the rear corner 18 at the post-separating device 17, the double clip 23 of the transfer device 19 grasps the item of laundry 10. In the process, a narrow peripheral strip 35 of the item of laundry 10 with stretched peripheral portion 34 is clamped in the intermediate space 26 between the clips 25 of the double clip 23. Said stretched peripheral portion 34 can start directly from the rear corner 18 or—as in the exemplary embodiment shown—can be spaced apart somewhat from the rear corner 18 (FIG. 5).

After the double clip 23 has grasped the item of laundry 10 and has formed the stretched peripheral strip 35 in the intermediate space 26, the double clip 23 is preferably rotated in the clockwise direction about its axis of rotation 27, specifically preferably by 90°. The double clip 23 can optionally also be pivoted here about its pivot axis 28 in such a manner that the clip mouths 33 of the two clips 25 of the double clips 23 run inclined downward toward their open ends by, for example, 45°. If the double clip 23 is not intended to be pivotable about the pivot axis 28, the double clip 23 has an invariable inclination which is directed downward to the open ends of the clip mouths 33 (FIG. 5).

Figure 1:
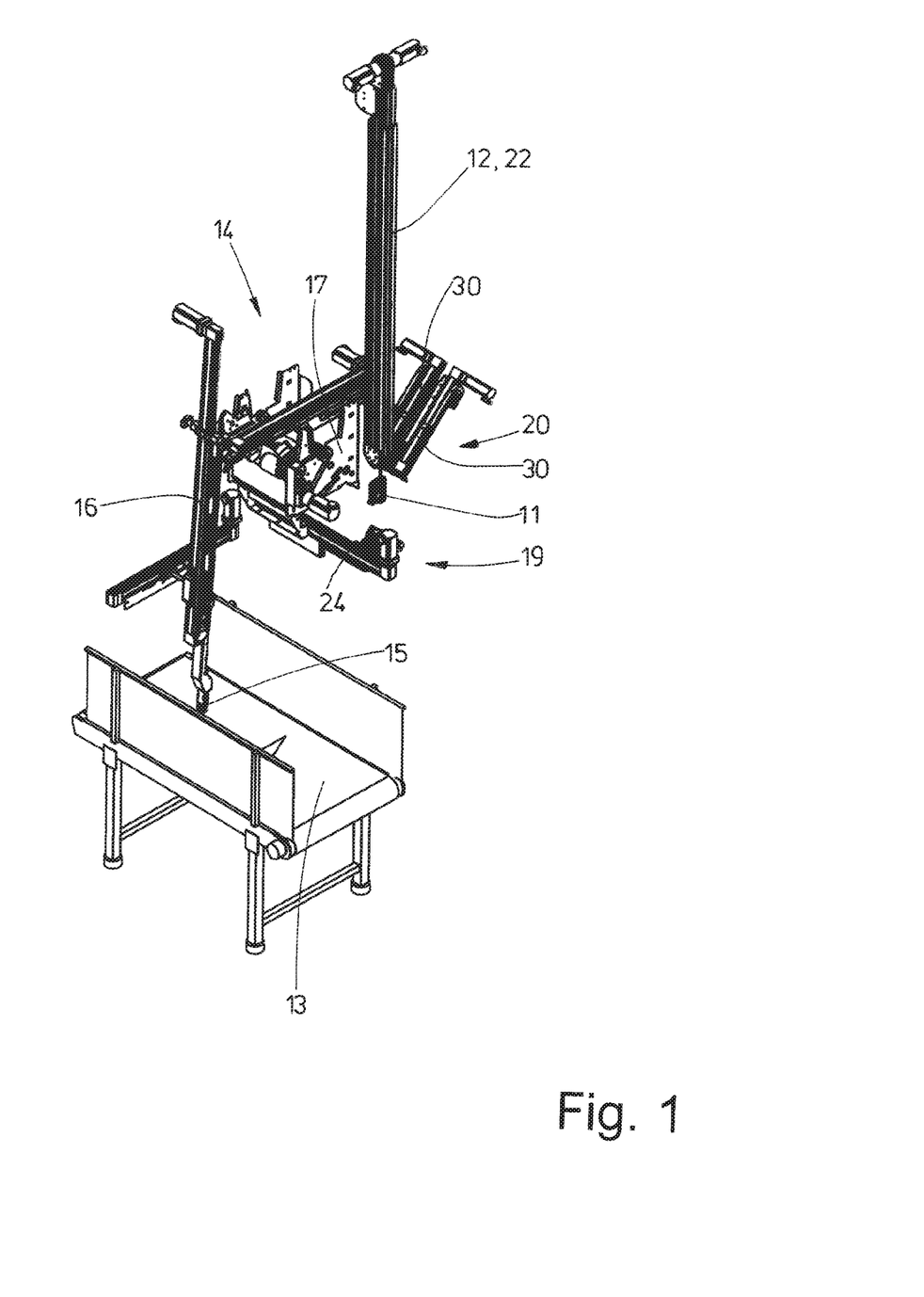
FIG. 1 shows a perspective view of the apparatus.
Figure 2:
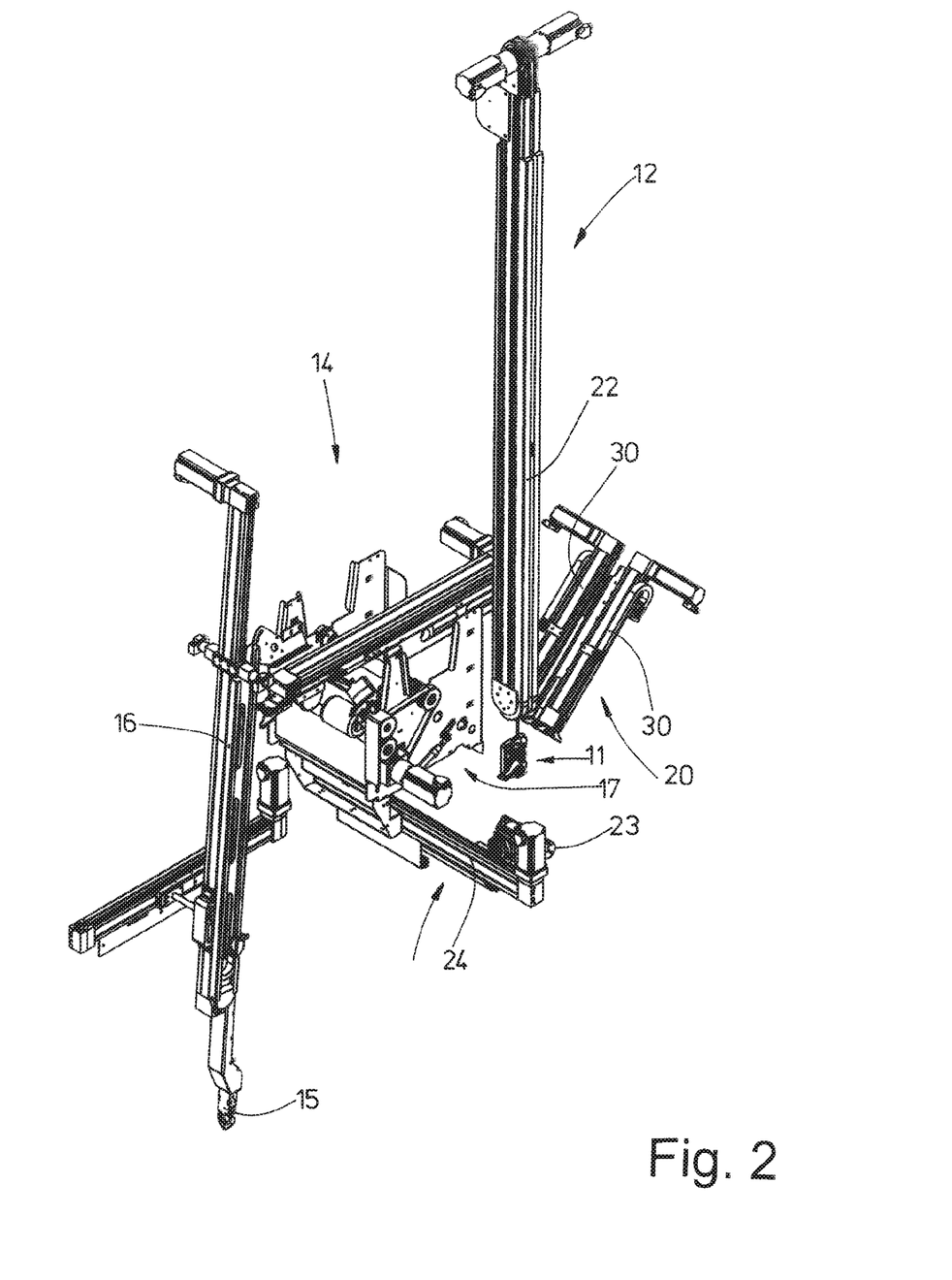
FIG. 2 shows an enlarged perspective illustration of part of the apparatus from FIG. 1.
Figure 3:
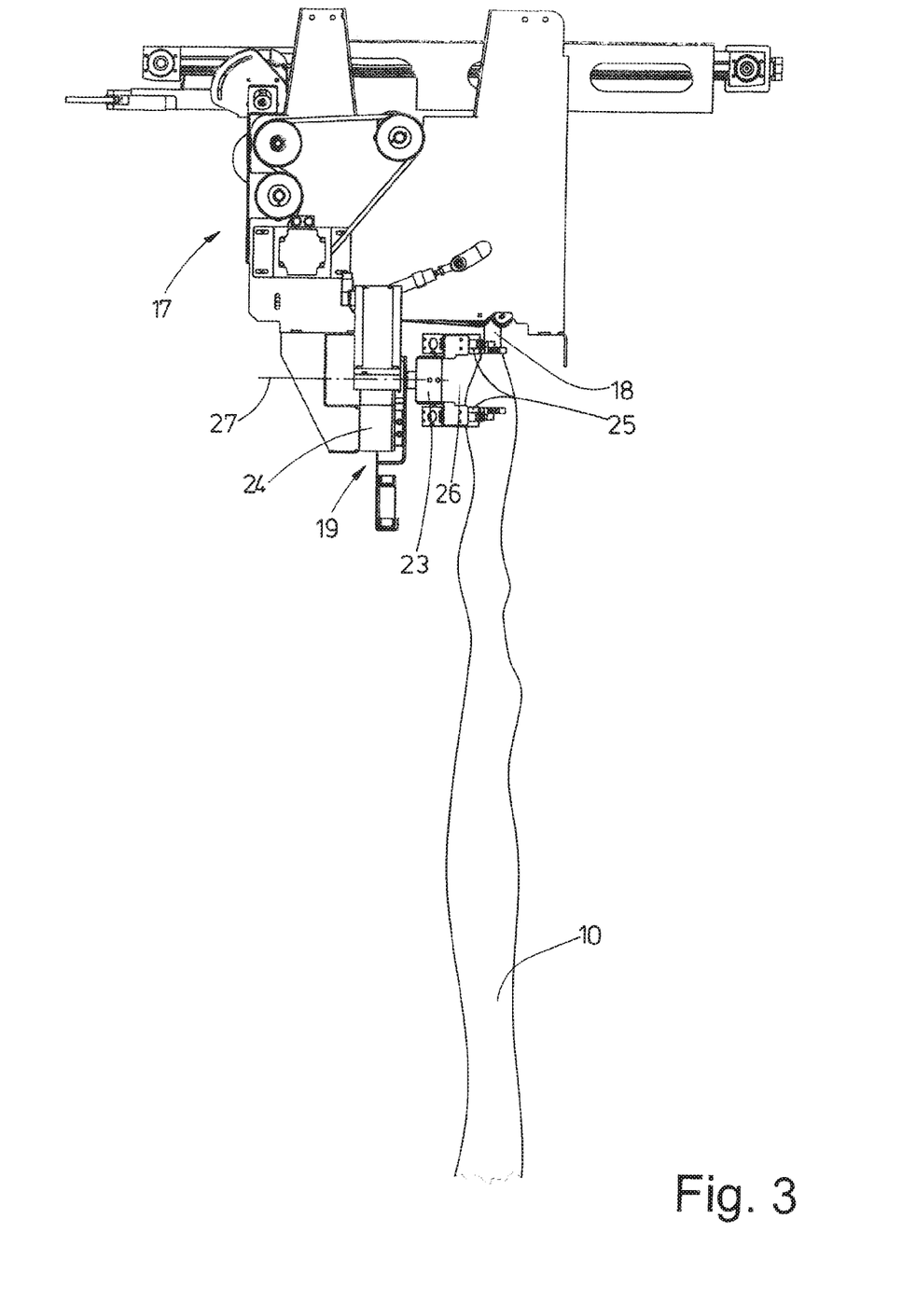
FIG. 3 shows a side view of a transfer device arranged downstream of a separator.
Figure 4:
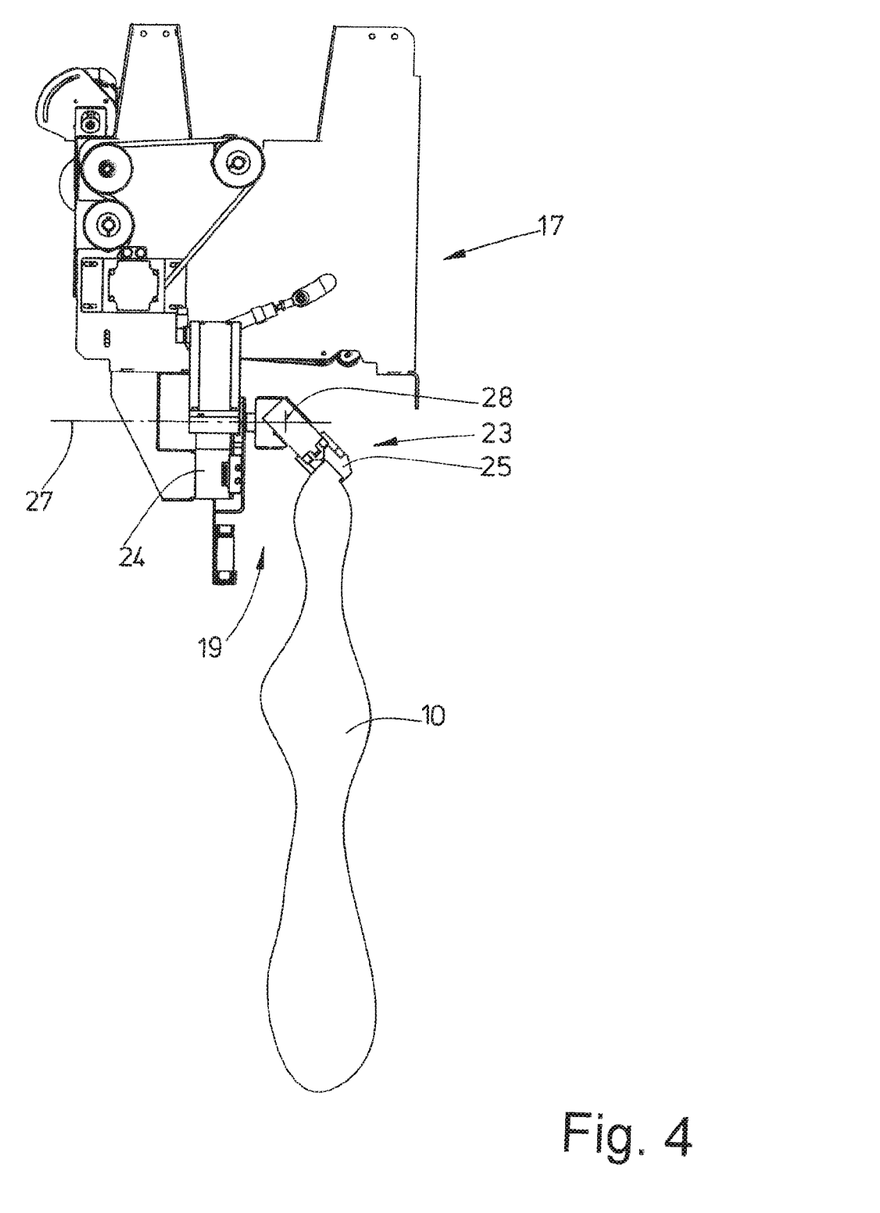
FIG. 4 shows the transfer device of FIG. 3 in a pivoted position of its double clip.
Figure 5:
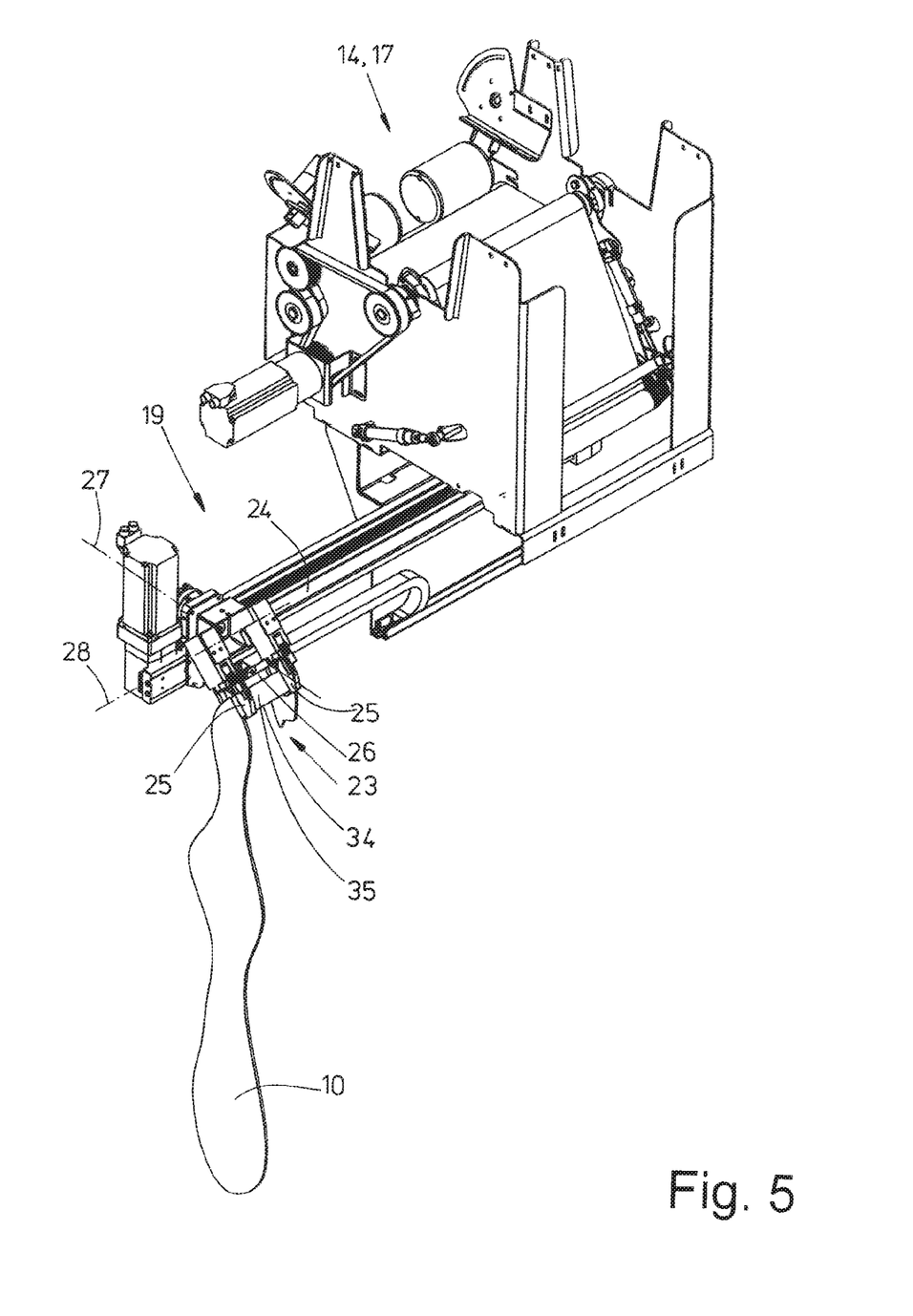
FIG. 5 shows a perspective illustration of the separator and of the transfer device arranged downstream thereof in a transfer position of an item of laundry.
Figure 6:
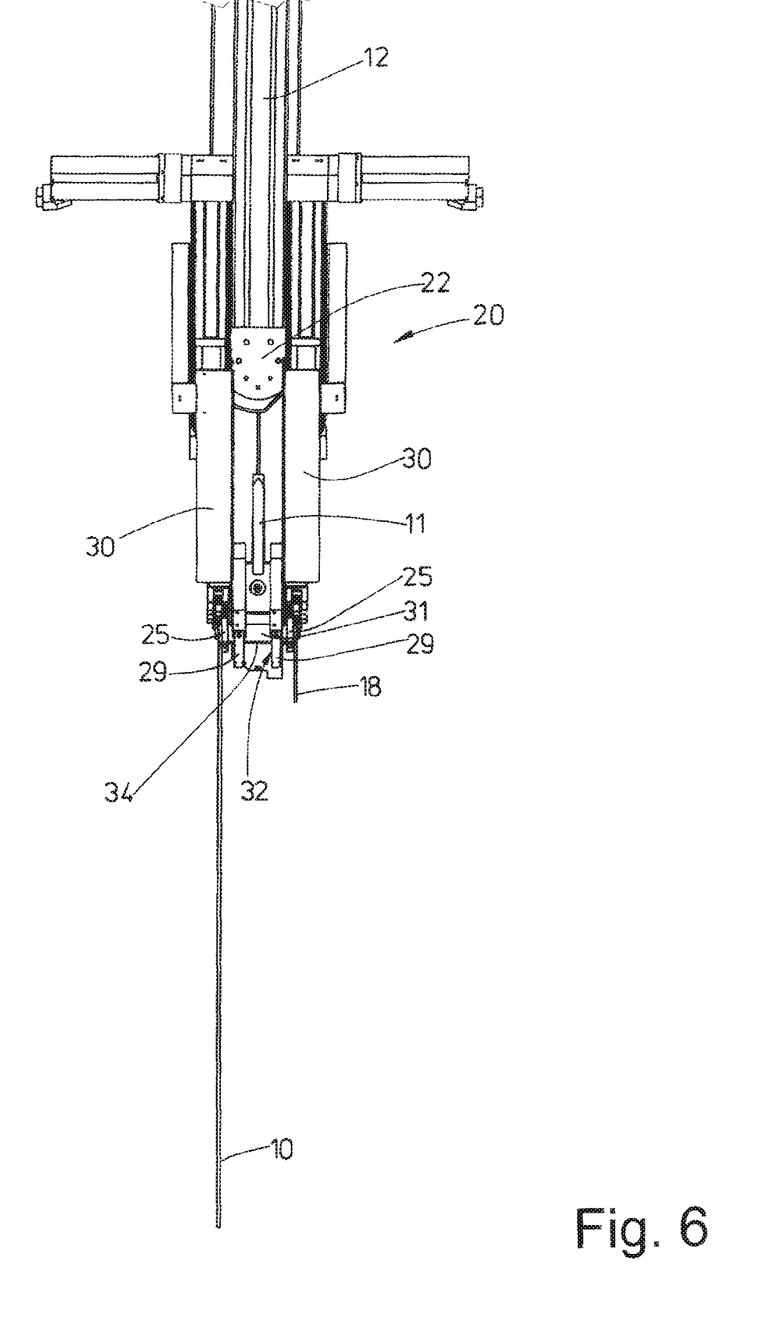
FIG. 6 shows a side view of the double clip of the transfer device and of a following loading device.
Figure 7:
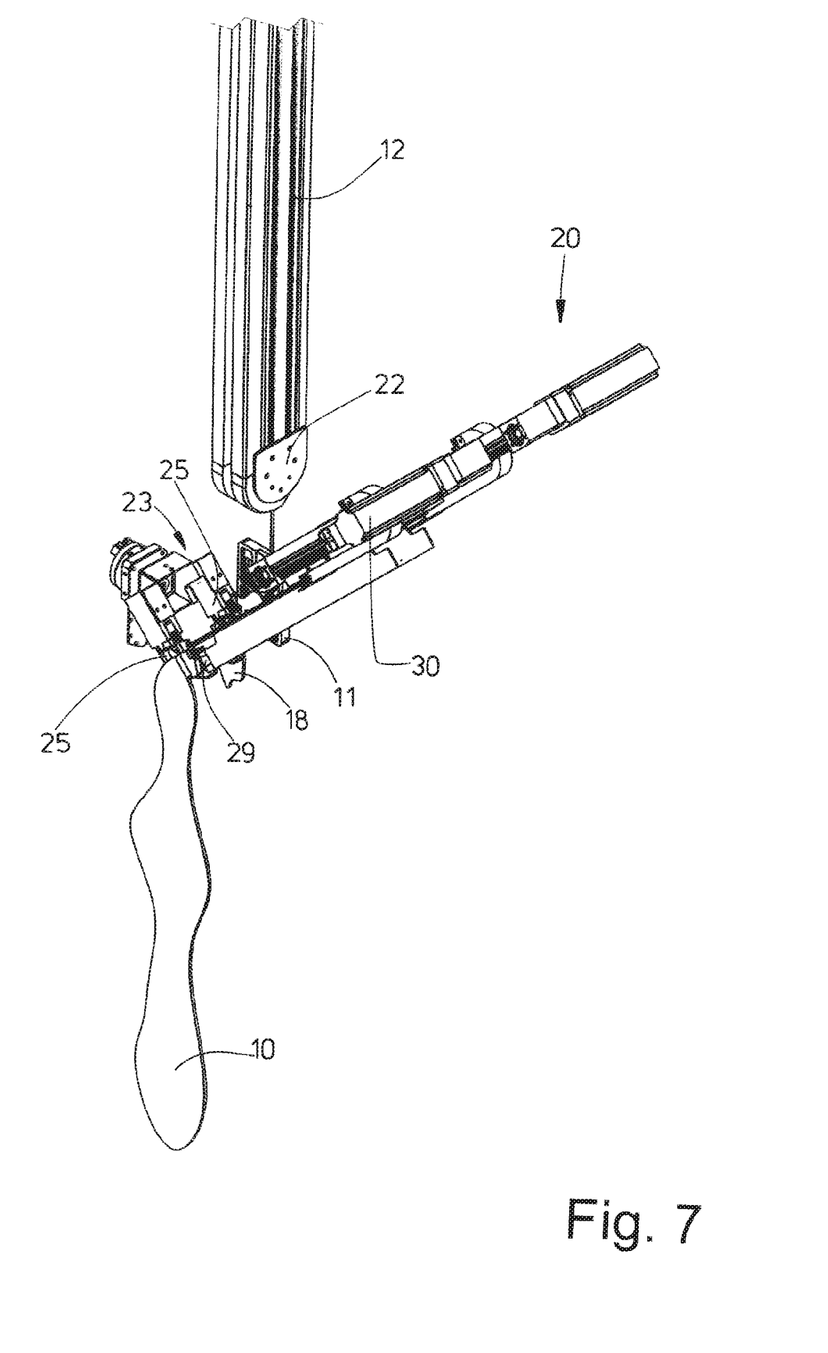
FIG. 7 shows a perspective illustration of the double clip and the loading device in a transfer of the item of laundry from the double clip into two adjacent, spaced-apart clips of the loading device.

At the same time during the rotation and optionally pivoting of the double clamp 23 or optionally also before or after same, the double clip 23 is moved by the shuttle cylinder 24 supporting it on a rectilinear, preferably horizontal path next to the post-separating device 17, specifically in such a manner that, at the end of said movement operation, the double clip 23 is located outside the region of the post-separating device 17, preferably laterally next to same and/or below same (FIG. 5). The double clip 23 of the transfer device 19 is then in a position for transferring or taking over the stretched peripheral portion 34 and preferably rectilinear peripheral strip 35 of the item of laundry 10 onto the two parallel, spaced-apart clips 29 of the loading device 20 (FIGS. 6 and 7). The position of the double clip 23 is then coordinated with the positions of the clips 29 of the loading device 20 by the clips 29 of the double clip 23 corresponding with each other.

To pick up the item of laundry 10, the two parallel shuttle cylinders 30 move the spaced-apart clips 29 synchronously on the parallel, rectilinear path in the direction of the double clip 23 of the transfer device 19. In the process, the clips 29 of the loading device 20 enter the intermediate space 26 between the two clips 25 of the double clip 23. This is possible because the opposite outsides of the two clips 29 of the loading device 20 are at a smaller distance than the width of the intermediate space 26 between the clips 25 of the double clips 23.

During the synchronous movement of the clips 29 of the loading device 20 between the clips 25 of the double clip 23 of the transfer device 19, the clips 29 are still open. The clips 29 are moved between the clips 25 to an extent so that, after the clips 29 are closed, their clip mouths 32 can grasp the peripheral portion 34 with the peripheral strip 35 of the item of laundry 10 stretched in the double clip 23. After the clips 29 of the loading device 20 are closed, the clips 25 of the double clips 23 are preferably opened at the same time. However, the closing of the clips 29 and the opening of the clips 25 can optionally also overlap by the clips 25 already being opened shortly before the complete closing of the clips 29. As soon as the clips 29 of the loading device 20 are closed and the clips 25 of the double clips 23 are opened, the clips 29 are moved back in the direction of the clip 11 to be loaded and the double clip 23 of the transfer device 19 is moved back into the starting position under the post-separating device 17 in order to take over a next item of laundry 10.

After the spaced-apart parallel clips 29 of the loading device 20 have taken over the item of laundry 10, they also hold the peripheral portion 34 with the peripheral strip 35 of the item of laundry 10 stretched. However, because of the smaller distance between the clips 29 of the loading device 20 in comparison to the clips 25 of the double clip 23, the peripheral portion 34 or peripheral strip 35 is narrower, namely just as narrow as the intermediate space 31 between the adjacent clips 29. The stretched peripheral portion 34 lies here on the closed side of the clip mouths 32 of the clips 29.

The two parallel shuttle cylinders 24 move the taken-over item of laundry 10 synchronously away from the transfer device 19, specifically the double clip 23 thereof, along the rectilinear path. The clips 29 of the loading device 20, said clips holding the item of laundry 10, move here along opposite flat sides of the stationary clip 11 which is held ready at the lower end of the loading portion 22 of the conveyor 12. The clips 29 here overtake as it were the clip 11 to be loaded. During said overtaking operation, the peripheral strip 35 with the stretched peripheral portion 34 of the item of laundry 10 is transferred to the clip 11 which is to be loaded and is momentarily at a halt for this purpose (FIGS. 7 and 8).

As a result of the parallel and approximately identically directed clip mouths 32 of the clips 29 and of the clip mouth 21 of the clips 11 to be loaded, the peripheral strip 35 held between the clips 29 is thus pushed with the peripheral portion 34 in front into the clip mouth 21 of the clip 11 to be loaded. The peripheral strip 35 of the item of laundry 10 is fixed here in the clip mouth 21 of the clip 11 and the clips 29 of the loading device 20 are opened during their further transportation along the rectilinear path predetermined by the shuttle cylinders 30 and/or the peripheral strip 35 of the item of laundry 10, after the latter is pushed into the clip mouth 21 of the clip 11, are pulled out of the clip mouths 32 of the adjacent clips 29 of the loading device 20.

Figure 8:
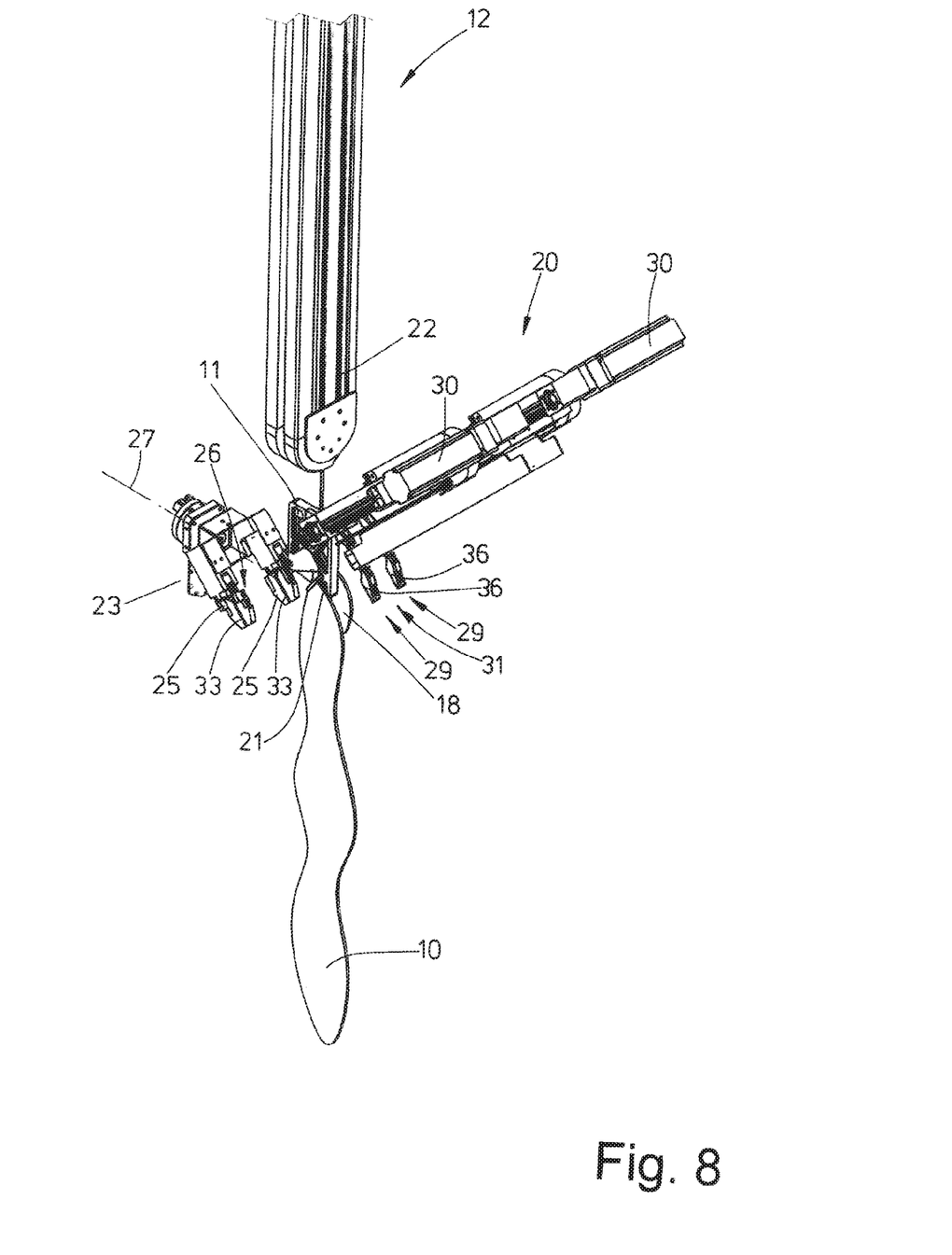
FIG. 8 shows a perspective view of the item of laundry hung by the two clips of the loading device into a clip mouth of a clip to be loaded on a conveyor.
Figure 9:
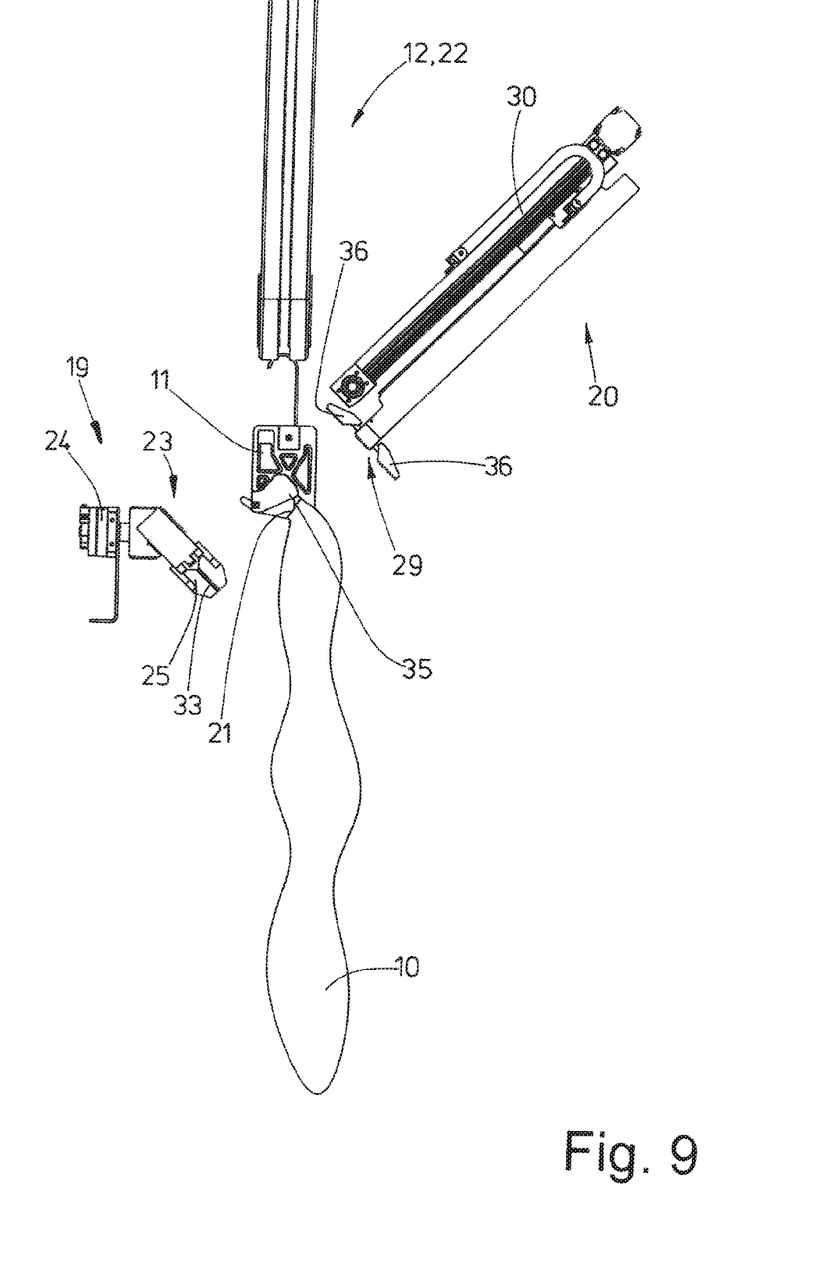
FIG. 9 shows a side view for illustrating FIG. 8.

In the exemplary embodiment shown, the two identical clip halves 36 of each clip 29 are pivoted by in each case 90° in opposite directions and, as a result, the clips are opened to such an extent that the clamping surfaces of the clip halves 36 bounding opposite sides of the clip mouth 32 lie on a straight line which intersects the linear movement axis of the shuttle cylinders 30 at right angles (FIGS. 8 and 9). For this purpose, the clips 29 are also provided with suitable drives.

In the exemplary embodiment shown, the clips 11 of the conveyor 12 are formed passively. That is to say, each clip mouth 32 is assigned a catch spring-pretensioned in the closing direction. When the peripheral strip 35 of the item of laundry 10 is pushed into the clip mouths 32 of the clips 29, the catches automatically firmly clamp the peripheral strip 35 of the item of laundry 10 pushed into the clip mouths 32. The release or opening of the clips 11 takes place over the course of the sorting station by means of external actuating means which directly or indirectly pivot the catch counter to the spring pretensioning in order to open the clip mouth 21 of the respective clip 11.

For the following item of laundry 10, a next empty clip 11 is moved by the conveyor 12 to the lower deflecting arc of its loading portion 22 and stopped here in turn momentarily for loading with the next item of laundry 10.

The invention is not restricted to clips 11 which are to be loaded and are held ready in the lower deflecting region of a loading portion 22 of a conveyor 12. The invention is also suitable for loading clips 11 which are held ready in another manner, in particular at another location, of any desired conveyor.

LIST OF REFERENCE SIGNS

10 Item of laundry
11 Clip
12 Conveyor
13 Belt conveyor
14 Separating device
15 Gripper
16 Shuttle cylinder
17 Post-separating device
18 Rear corner
19 Transfer device
20 Loading device
21 Clip mouth
22 Loading portion
23 Double clip
24 Shuttle cylinder
25 Clip
26 Intermediate space
27 Axis of rotation
28 Pivot axis
29 Clip
30 Shuttle cylinder
31 Intermediate space
32 Clip mouth
33 Clip mouth
34 Peripheral portion
35 Peripheral strip
36 Clip half

What is claimed is:

1. A method for loading a clip (11) with an item of laundry (10), the item of laundry (10) being separated by a separating device (14) and subsequently being transferred to the clip (11) to be loaded, wherein the method comprising the steps of:
grasping the item of laundry (10) is by a movable double clip (23) of a transfer device (19) downstream of the separating device (14);
stretching and keeping stretched a peripheral strip (35) or corner region of the item of laundry (10) located between the adjacent clips (25) of the double clip (23) by the double clip (23) of the transfer device (19);
taking over or transferring the item of laundry (10) from the double clip (23) by two adjacent clips (29) of a loading device (20); and
feeding the item of laundry (10) into the clip (11) to be loaded by synchronous movement and moving of the adjacent clips (29) of the loading device (20) past the clip (11) to be loaded,
wherein a peripheral portion (34) or corner region of the item of laundry (10) located between the adjacent clips (29) of the loading device (20) is kept stretched by the adjacent clips (29) of the loading device (20), and
wherein the item of laundry (10) with the peripheral portion (34) or corner region kept stretched by the adjacent clips (29) of the loading device (20) is pushed into the clip (11) to be loaded as the adjacent clips (29) of the loading device (20), which are spaced-apart, move past the clip (11) to be loaded.

2. The method as claimed in claim 1, wherein the peripheral strip (35) or corner region of the item of laundry (10) kept stretched by the double clip (23) is reoriented at the double clip (23).

3. The method as claimed in claim 1, wherein, for taking over an item of laundry (10) from the two adjacent clips (29) of the loading device (20), the clip (11) to be loaded is briefly stopped in a lower deflecting region of a U-shaped loading portion (22) of a conveyor (12).

4. The method as claimed in claim 3, wherein the clip (11) to be loaded is loaded with the item of laundry (10) with clip mouths (32) oriented transversely with respect to the vertical plane in which the conveying section in the U-shaped portion of the conveyor (12) runs.

5. An apparatus for loading a clip (11) with an item of laundry (10), comprising:
a separating device (14);
a transfer device (19) preferably following the separating device (14);
a loading device (20) arranged downstream of the transfer device (19), from which loading device (20) the item of laundry (10) is transferrable into the respective clip (11) to be loaded; and
a conveyor (12) which has a plurality of clips (11) to be loaded,
wherein the transfer device (19) has at least one double clip (23),
wherein the loading device (20) has two clips (29), which are adjacent and spaced-apart from each other, designed for taking over a peripheral strip (35) or corner region, held by the double clip (23), from the double clip (23) with the stretched state of the peripheral strip (35) or corner region being maintained,
wherein the two clips (29) of the loading device (20) are movable along on opposite sides of the respective clip (11) to be loaded, in order to transfer the respective item of laundry (10) from the two clips (29) of the loading device (20) to the respective clip (11) to be loaded which is held ready to be loaded, and
wherein, when the two clips (29) of the loading device (20) move past the respective clip (11) to be loaded, the peripheral portion (34) or corner region of the item of laundry (10) kept stretched by the clips (29) of the loading device is pushed into the respective clip (11) to be loaded and can be pulled out of or can be released from the clips (29) of the loading device (20).

6. The apparatus as claimed in claim 5, wherein the double clip (23) is rotatable about an axis of rotation (27) which perpendicularly intersects an imaginary connecting line between two spaced-apart clips (25) of the double clip (23).

7. The apparatus as claimed in claim 6, wherein an inner distance between the two spaced-apart clips (25) of the double clip (23), which are adjacent to each other, is greater than the outside distance of the two clips (29) of the loading device (20).

8. The apparatus as claimed in claim 5, wherein the double clip (23) is designed to keep the peripheral strip (35) and/or a peripheral portion (34) of the item of laundry (10) stretched, wherein the peripheral strip (35) is located at or in the corner region of the item of laundry (10).

9. The apparatus as claimed in claim 5, wherein the inner distance between the two clips (29) of the loading device (20) is greater than the width of the respective clip (11) to be loaded.

10. The apparatus as claimed in claim 5, wherein the two clips (29) of the loading device (20) are movable to and fro along a rectilinear path lying on the axis of rotation (27) of the double clip (23).

* * * * *